Sept. 1, 1931.  K. IMHOFF  1,820,978
DIGESTION OF COARSE SUBSTANCES LEFT ON SEWAGE
SCREENS IN THE SEWAGE TREATMENT
Filed Nov. 9, 1927

Patented Sept. 1, 1931

1,820,978

UNITED STATES PATENT OFFICE

KARL IMHOFF, OF ESSEN, GERMANY

DIGESTION OF COARSE SUBSTANCES LEFT ON SEWAGE SCREENS IN THE SEWAGE TREATMENT

Application filed November 9, 1927, Serial No. 232,170, and in Germany September 30, 1927.

The coarse substances left on sewage screens in sewage treatment, cannot be disposed of in an odorless manner, because they decay in a very short time by a bad-smelling acid fermentation. If thrown into a digestion chamber used for a digestion of sewage sludge, they remain generally as a floating cover on the surface level thereof and cannot be digested except with great difficulty.

According to the present invention, said drawback is overcome by bringing said coarse substances in contact with digesting sludge in alkaline fermentation and thoroughly mixing it therewith, prior to their supply to the digestion chamber. By said thorough mixing the coarse substances are broken into small pieces, and their acid fermentation is obviated.

Figure 1:
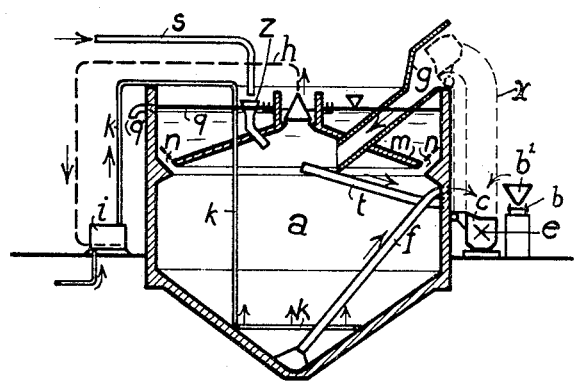
Figure 2:
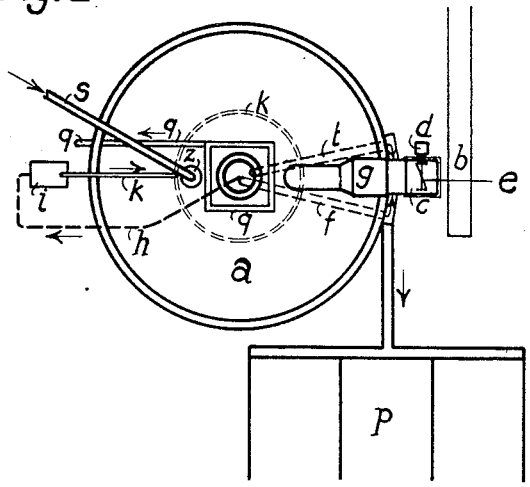

The accompanying drawings show by way of example how the invention can be put into practice:

Figs. 1 and 2 are respectively a vertical central section and a plan view of a digestion chamber that is particularly adapted for the purpose in question.

Beside a sludge digestion chamber $a$ a rail track $b$ is provided, along which the coarse substances are carried by tip cars $b^1$, whence they are delivered into a mixing vessel $c$. Into the latter the digesting sludge is supplied in a proportion of 2 parts of sludge to 1 part of coarse substances. A motor $d$ with agitator $e$ serves for mixing the sludge and coarse substances.

The digesting sludge is for example carried from the bottom of the sludge chamber through a pipe $f$; it can, however, also be supplied from another sludge chamber through a pipe branched off from the pipe $s$, this being particularly required for starting the working of the sludge digestion chamber $a$.

Upon the coarse substances being thoroughly mixed with the digesting sludge in the vessel $c$, the latter is lifted by means of an elevator indicated by the dotted lines $x$ in Fig. 1. Then, the contents thereof are supplied from above through a hopper $g$ to the digestion chamber $a$.

The chamber is heated by means of a heater $i$ to which the digestion gases collected by the gas hood $m$ with sieve-covered slots $n$ at its circumference are supplied as fuel through a pipe $h$. From the heater a pipe $k$ leads the hot water into the bottom end of the digestion chamber. The excess water escapes through an overflow pipe $q$ at the surface level of the digestion chamber.

In case that, in spite of the thorough mixing, a floating cover of undecomposed matter settles below the gas hood $m$, it can be led off from time to time through a conduit $t$ and again supplied to the mixing vessel $c$.

The digested sludge from the digestion chamber is led off on to a drying place $p$.

The coarse substances require for their complete digestion a certain addition of water, which is attained by the supply of the hot water through the pipe $k$. For the same purpose, however, digestion sludge from another digestion chamber can be supplied through the pipe $s$ and a funnel $z$ leading into the interior of the digestion chamber.

The alkaline fermentation, to which I have previously referred, takes place in known manner within the digestion chamber because of the digestion therein of the sludge which, of course, settles from the sewage to the bottom of the chamber on account of its weight. In this connection, it is well to distinguish between the screenings or coarse substances taken from the sewage screens, and the sludge. The screenings consist of coarse substances which float on top and are removed by means of sieves, while the sludge is the heavy matter that settles to the bottom and produces by its digestion the alkaline fermentation. Screenings, taken alone, are not productive, actively at least, of the alkaline fermentation.

In carrying out my invention, therefore, I take the screenings, which do not ferment on their own account in alkaline fermentation, and mix them with sludge which has already assumed the known state of alkaline fermentation within the digestion chamber.

In the use of my method, under which the screenings are broken up and thoroughly intermixed with digesting sludge in alkaline fermentation and the resultant pseudo-sludge substance introduced into the digestion chamber, acid fermentation is obviated, and for further treatment it is unnecessary always to have at command a new or fresh supply of sludge, since through the pipe *f* from the digestion chamber *a*, a supply of sludge which is in a state of alkaline fermentation suitable for the mixing operation, can always be produced.

What I claim, is.

1. The combination of a digesting chamber to receive sludge, a movable vessel for receiving screening, a pipe in said chamber for conveying sludge to said vessel to mix with the contents therein, and a hopper through which the intermixed contents of said vessel can be discharged into the chamber.

2. The combination of a digesting chamber for sludge, a movable vessel to receive screenings outside of said chamber, a pipe for conveying part of the sludge in the chamber to said vessel to be mixed with the contents thereof and delivered to said chamber, and a pipe mounted in said chamber in position to convey undecomposed matter from the upper part of said chamber into said vessel on the outside thereof.

3. Steps in the method of digesting coarse sewage substances gathered from screens in the treatment of sewage, which steps consist in putting a batch of the coarse floatable screened-out sewage substances which do not of their own account ferment in alkaline fermentation, in a vessel separate from the vessel containing the sewage undergoing digestion, withdrawing from the sewage undergoing digestion the sludge settlings which are in a state of alkaline fermentation, intermixing the removed sludge settlings with the coarse substances in the separate vessel, breaking up the coarse substances into fragments during the intermixing process to bring the broken up fragments into direct contact with the alkaline sludge settlings so as to prevent odorous acid fermentation of the fragments and to produce a pseudo-sludge mixture, feeding the pseudo-sludge mixture into the sewage sludge undergoing digestion in a state of alkaline fermentation and continuing the digestion of the same together until the heavy matter settles as sludge settlings in alkaline fermentation, and thence repeating the aforesaid steps, withdrawing for each admixture with each fresh batch of coarse substances a fresh supply of sludge settlings in alkaline fermentation.

In testimony whereof I have hereunto set my hand.

KARL IMHOFF.